US012403063B2

(12) United States Patent
Heltsley

(10) Patent No.: US 12,403,063 B2
(45) Date of Patent: Sep. 2, 2025

(54) EXTENDED HANDLE MECHANISM FOR PERCUSSIVE MASSAGE DEVICE AND METHOD OF USE

(71) Applicant: Ninefold Design, LLC, San Francisco, CA (US)

(72) Inventor: Seth Russell Heltsley, San Francisco, CA (US)

( * ) Notice: Subject to any disclaimer, the term of this patent is extended or adjusted under 35 U.S.C. 154(b) by 818 days.

(21) Appl. No.: 17/399,703

(22) Filed: Aug. 11, 2021

(65) Prior Publication Data

US 2022/0079836 A1 Mar. 17, 2022

Related U.S. Application Data

(60) Provisional application No. 63/078,153, filed on Sep. 14, 2020.

(51) Int. Cl.
*A61H 15/00* (2006.01)

(52) U.S. Cl.
CPC . *A61H 15/0085* (2013.01); *A61H 2201/0107* (2013.01); *A61H 2201/0153* (2013.01)

(58) Field of Classification Search
CPC ................ A61H 15/0085; A61H 23/06; A61H 2201/0107; A61H 2201/0119; A61H 2201/0123; A61H 2201/0126; A61H 2201/0153; A61H 2201/0192; B25B 23/16; Y10S 224/908
USPC ...... 16/427, 430; 81/491; 224/185, 930, 908
See application file for complete search history.

(56) References Cited

U.S. PATENT DOCUMENTS

| | | | | |
|---|---|---|---|---|
| 2,688,960 | A | 9/1954 | Fischer et al. | |
| 3,856,002 | A | 12/1974 | Matsumoto | |
| 4,266,536 | A | 5/1981 | Casares | |
| 4,381,766 | A | 5/1983 | Avolio | |
| 4,669,452 | A | 6/1987 | Osawa | |
| 4,798,198 | A | 1/1989 | Wright | |
| 5,070,576 | A * | 12/1991 | Banta | B25F 5/021 16/427 |
| D326,525 | S | 5/1992 | Shimizu | |
| 5,117,815 | A | 6/1992 | Gentry et al. | |
| 5,411,238 | A * | 5/1995 | Caron | F16M 13/00 248/219.2 |
| 5,530,983 | A | 7/1996 | Maltese | |
| 5,560,746 | A | 10/1996 | Willow | |
| 5,787,590 | A * | 8/1998 | D'Alessandro, Sr. | A01G 3/053 30/296.1 |
| 5,848,980 | A | 12/1998 | Demerais | |
| 6,241,693 | B1 | 6/2001 | Lambden | |
| D444,566 | S | 7/2001 | Thomas et al. | |
| 6,261,251 | B1 | 7/2001 | Meyers | |
| 6,432,072 | B1 | 8/2002 | Harris et al. | |

(Continued)

OTHER PUBLICATIONS

U.S. Appl. No. 63/007,014, filed Apr. 8, 2020 (Year: 2020).*

*Primary Examiner* — Colin W Stuart
*Assistant Examiner* — Douglas Y Sul

(57) ABSTRACT

An extended handle for securely holding reciprocating massage devices. The handle includes a handle section and a mounting section, the mounting section providing a channel designed to hold conventional reciprocating massage devices of differing geometries from various manufacturers and the handle section oriented to distribute the weight of an attached reciprocating massage device while allowing a user to easily position the attached massage device relative to various parts of the user's body.

18 Claims, 8 Drawing Sheets

(56) References Cited

U.S. PATENT DOCUMENTS

| | | | | |
|---|---|---|---|---|
| 7,122,015 | B2 | 10/2006 | Luettgen et al. | |
| 7,937,792 | B2 | 5/2011 | Munn et al. | |
| 8,313,424 | B2 | 11/2012 | Gabrielidis | |
| 9,168,196 | B2 | 10/2015 | Dagan | |
| 9,532,918 | B1 * | 1/2017 | Louis | A61H 7/003 |
| 10,442,072 | B2 | 10/2019 | Kemp | |
| 10,952,921 | B1 | 3/2021 | Kesner et al. | |
| 10,959,908 | B2 | 3/2021 | Lee et al. | |
| 2004/0215115 | A1 | 10/2004 | Sheen | |
| 2005/0113726 | A1 | 5/2005 | Prettyman | |
| 2006/0116614 | A1 | 6/2006 | Jones et al. | |
| 2009/0093743 | A1 * | 4/2009 | Corzine | A47K 7/028<br>601/134 |
| 2011/0087140 | A1 | 4/2011 | Lee | |
| 2013/0292622 | A1 * | 11/2013 | Waite | A61H 3/00<br>256/65.01 |
| 2019/0060162 | A1 | 2/2019 | Martin | |
| 2019/0152042 | A1 * | 5/2019 | Kemp | A61H 7/003 |
| 2020/0269410 | A1 * | 8/2020 | Frenken | B25F 5/02 |
| 2021/0161759 | A1 * | 6/2021 | Minkus | A61H 37/00 |
| 2021/0315769 | A1 * | 10/2021 | Shemiranipour | A61H 39/04 |
| 2021/0361519 | A1 * | 11/2021 | Hagy | A61H 7/005 |
| 2022/0104997 | A1 * | 4/2022 | Lawrie | B25G 3/34 |

* cited by examiner

EXTENDED HANDLE MECHANISM FOR PERCUSSIVE MASSAGE DEVICE AND METHOD OF USE

CROSS-REFERENCE TO RELATED APPLICATIONS

This application claims the benefit of U.S. Provisional Patent Application No. 63/078,153, filed Sep. 14, 2020, which is incorporated by reference herein in its entirety.

BACKGROUND OF THE INVENTION

The present invention generally relates to the field of physical therapy, massage therapy, and pain and stress management, more particular relating to a handheld device useful for improving upon existing handheld percussive massage devices. The embodiments discussed herein capitalize on leverage, positional geometry, and extended range to encourage an improved experience with a massage gun.

Back massage has been relied upon in the past in providing both psychological and physiological effects. As the amount of time spent in sedentary jobs has increased, an increasing amount of attention is being paid to back massage devices and techniques.

Concurrently, in recent years, percussive massage devices, sometimes referred to as massage guns or reciprocating massage guns or reciprocating massage devices, have become more popular. By providing concentrated, rapid, short-duration pulses to a muscle, percussive massage tools are valued because they help with muscle pain and recovery. The repeated pulses are intended to aid in increasing blood flow to muscles, which can help reduce inflammation and muscle tension. These devices are regularly used by individuals with chronic pain or tension as well as by athletes seeking to aid in their recovery. In part because percussive massage tools can be purchased for under $500 and can be used inside one's home, they have become popular tools that often supplement or replace visiting a massage therapist.

While percussive massage devices have become a popular substitute to or supplement for traditional massage therapy, the devices have limited utility in assisting users with back pain. In particular, due to the shape of most percussive massage devices, in order to apply a reciprocating massage head to a user's back, the user must hold the device with one hand and either bend an arm over the shoulder or behind the back. In either case, it is difficult to obtain and hold a position whereby the reciprocating massage head reciprocates in a direction that is perpendicular (or approximately perpendicular) to the user's back, and it is challenging for the user to apply force in a direction that presses the massage head into the back. Furthermore, because of the body positioning required to apply force to the massage device on one's own back, some of the very muscle groups targeted by the massage device may be required to apply force to the device. The result of utilizing these muscle groups in holding the massage device behind a user's own back is that the target muscle groups are not properly relaxed during application of the massage device, and thus the beneficial effect of the massage may be limited. Similar challenges related to a user's flexibility may make it difficult for a user to fully utilize a percussive massage device on other parts of the body, such as a user's hamstrings or glutes. Additionally, in comparison to vibrating massage devices used in the past, reciprocating massage devices rely upon strong motors powered by heavy batteries to actuate a piston. The piston-powered reciprocation is strong, making it difficult to hold the massage gun in place with the standard mechanical advantage afforded by the limbs of the human body. Furthermore, the typical weight of massage gun devices makes it challenging for a user to lift and hold the massage gun for long periods of time.

What is needed is a device that enables a user to hold a percussive massage device in such a way that the device may be easily applied to a user's back that does not require substantial flexibility of the user. Additionally, because certain percussive massage devices are heavy, it may be advantageous to provide a system that allows other portions of the user's skeletal system to support the weight of the percussive massage device rather than relying on the strength of a single arm. Furthermore, given the weight of the percussive massage device, in certain embodiments it may be advantageous to provide a device that can provide a mechanical advantage in certain body positions. Further, because there are many different models of percussive massage devices available (many with differing sizes or geometric configurations), it may be advantageous to provide an after-market solution that is adaptable to hold percussive massage devices created by different manufacturers.

SUMMARY

As depicted in FIG. 1*a*, in one embodiment handle mechanism 100 with curves that complement the human form is used. The elongated handle mechanism comprises an elongated tube with a mounting region that is configured to easily receive a number of different handle shapes of reciprocating massage devices. The handle mechanism additionally comprises two natural gripping points for a user's hands. The mounting region is equipped with a mounting mechanism (e.g., thick straps and a ratcheting buckle system) that is capable of securing a reciprocating massage device and tolerating the forces created by conventional reciprocating massage devices.

In one aspect of the invention, an extended handle for a personal massage device is provided, the extended handle comprising an elongated rigid structure including a working end and a handling end, wherein said working end comprises a mounting mechanism configured to secure a handle portion of a reciprocating massage gun.

In certain embodiments, the mounting mechanism comprises an angular channel comprising a channel surface facing the handling end and an exterior surface, a padding material affixed to the channel surface; and a clamping mechanism attached to the exterior surface.

In certain embodiments, the clamping mechanism comprises a buckle affixed to the exterior surface and a strap affixed to said exterior surface, wherein the buckle is configured to engage said strap to secure an object placed in the angular channel.

In certain embodiments, the object placed in the angular channel of the extended handle mechanism is the handle portion of the reciprocating massage gun, wherein the reciprocating massage gun further includes an axis of reciprocation, and the working end is positioned between 21 and 37 inches from the bottom of said angular channel, the distance measured along said axis of reciprocation of said reciprocating massage gun.

In certain embodiments, the elongated rigid structure further comprises a first curved portion, a second curved portion; and a third curved portion.

In certain embodiments, the first curved portion is located proximal to the working end and has an arc angle of approximately 119 degrees, the third curved portion is located proximal to the handling end and has an arc angle of approximately 78 degrees, and the second curved portion is located between the first curved portion and the third curved portion and has an arc angle of −18 degrees.

In certain embodiments of the invention, the sum of the arc angles of the first, second, and third curved portions is approximately 180 degrees.

In certain embodiments of the invention, the working end further comprises a flat surface opposite the angular channel, the flat surface attached to the working end at the exterior surface.

In certain embodiments, the elongated rigid structure comprises three telescoping sections. In some embodiments, the telescoping sections are secured to adjacent telescoping sections utilizing a spring button and an O-ring.

In one aspect of the invention, an extended handle for a personal massage device is provided, the extended handle comprising an elongated rigid structure comprising a working end and a handling end, wherein said working end comprises a flattened portion of the elongated rigid structure. The flattened portion of includes a first flat side, a second flat side, and a mounting mechanism configured to secure a handle portion of a handheld massage device.

In certain embodiments, the mounting mechanism comprises a buckle flange, a strap flange, a buckle, and a strap wherein the buckle flange comprises a first angled face, a buckle face, and a first tube mating face. The first angled face is adjacent to the buckle face and the first tube mating face, the first angled face is disposed at a 135 degree angle to the first tube mating face, and the first angled face is further disposed at a 45 degree angle to the buckle face. The first tube mating face is attached to the first flat side of the flattened portion of said elongated rigid structure and the buckle is attached to the buckle face. The strap flange comprises a second angled face, a strap face, and a second tube mating face. The second angled face is adjacent to the strap face and the second tube mating face. The second angled face is disposed at a 135 degree angle to the second tube mating face, and the second angled face is further disposed at a 45 degree angle to the strap face. The second tube mating face is attached to the second flat side of the flattened portion of the elongated rigid structure and the strap is attached to the strap face.

In certain embodiments, the extended handle additionally comprises a flat surface, the flat surface being attached to the working end, perpendicular to the plane of the buckle face and the strap face, and nonadjacent to the first angled face and the second angled face.

In certain embodiments, additional ergonomic features are provided to enhance the experience of utilizing the device. For example, additional gripping elements may be added to the elongated tube of handle mechanism 100 to enable a user to more easily or more securely hold the device. Additionally, as depicted in FIG. 1*b*, in an alternative embodiment, extended handle 150 may be divided into telescoping sections 160, 170, and 180, enabling a user to dissemble the device and store it in a more compact form. In some embodiments, a back box 190 with flat surface 196 is included opposite the mounting region of the device. Back box 190 with flat surface 196 is secured to the mounting region and provides a surface for a user to utilize a wall or other bulwark in applying additional pressure to a reciprocating massage device.

In one aspect of the invention, a method is provided for using a utilizing an extended handle for a reciprocating massage device. The method comprises the steps of placing the reciprocating massage device in an angular channel of the extended handle mechanism, the extended handle mechanism comprising a working end, a handling end, and multiple curved portions, wherein the angular channel is disposed at the working end of the extended handle mechanism, wherein the working end further comprises a fastening mechanism, and wherein the sum of the arc angles of the multiple curved portions is approximately 180 degrees, securing the reciprocating massage device to the handle mechanism using the fastening mechanism, activating the reciprocating massage device, holding the reciprocating massage device with at least one hand at the handling end, positioning the reciprocating massage device at a desired position on a user's body by applying force to the extended handle mechanism, and applying force to the handling end to engage said reciprocating massage device with said user's body at the desired position.

BRIEF DESCRIPTION OF THE DRAWINGS

To ensure that the invention will be readily understood, a more particular description of the invention briefly described above will be rendered by reference to specific embodiments illustrated in the appended drawings. Understanding that these drawings depict only typical embodiments of the invention and are not to be considered to be limiting of its scope, the invention will be described and explained with additional specificity and detail through the use of the accompanying drawings, in which.

DETAILED DESCRIPTION OF THE INVENTION

Figure 1A:
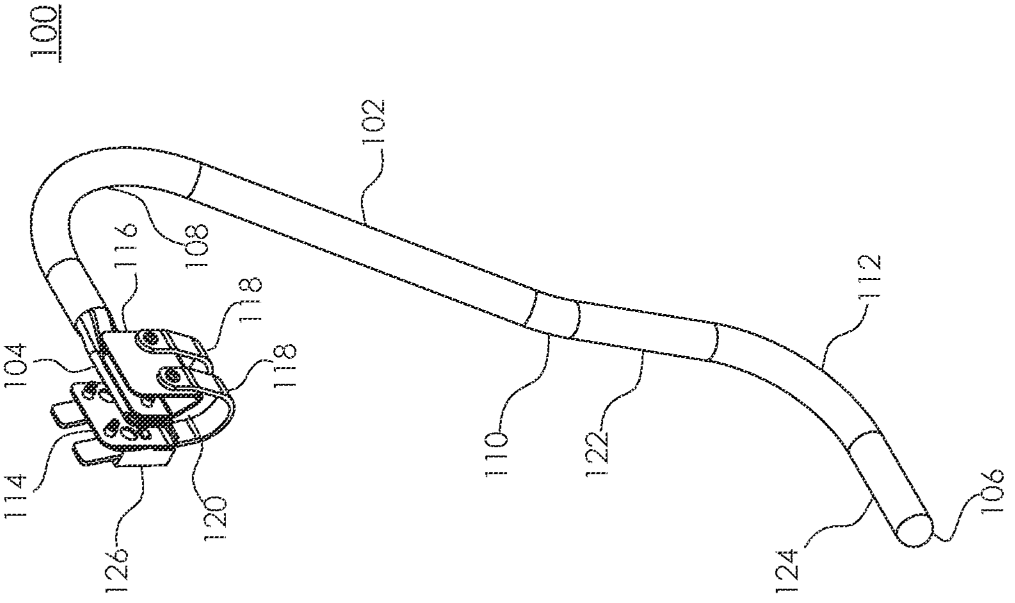
FIG. 1*a* shows various aspects of the extended handle mechanism in accordance with one embodiment.

As depicted in FIG. 1*a*, a handle mechanism 100 for interfacing with a reciprocating massage device is provided. Curved metal tube 102 is depicted with a flattened end 104 and a distal end 106. In one embodiment, curved metal tube 102 comprises three major curves 108, 110, and 112. Curved metal tube 102 may be comprised of aluminum, carbon steel, or other rigid material, including plastic instead of metal. Curved metal tube 102 need not be hollow but could be any rigid material that could be grasped by a user's hand, and is of sufficient diameter to allow for easy grasping. In one embodiment, curved metal tube 102 is 32 mm in outside diameter, but other sizes may be acceptable. In one embodiment, metal tube 102 comprises a single tube. In another embodiment, metal tube 102 comprises multiple tube pieces which may be fit together to enable disassembly of handle mechanism 100 for convenient storage. In another embodiment, metal tube 102 is comprised of multiple hinged members so that the handle mechanism 100 may be folded for convenient storage.

Buckle mount 114 and strap mount 116 are attached to flattened end 104. Buckle mount 114 and strap mount 116 are designed with angled portions such that by arranging buckle mount 114 and strap mount 116 so that their angled portions face opposite one another, massage gun cavity 120 is created with an approximate 90 degree angle to allow for holding a reciprocating massage device (reciprocating massage device not pictured). In another embodiment, for example when curved metal tube is instead made from molded plastic, buckle mount 114 and strap mount 116 are bodily incorporated into flatted end 104.

In one embodiment, flattened end 104 is formed by crimping curved metal tube 102. Other methods for creating a flattened end of metal tube 102 may be used as would be apparent to one of skill in the art. In one embodiment, flattened end 104 comprises a flattened portion of approximately 120 mm so that buckle mount 114 and strap mount 116 can accommodate multiple straps and buckles, although differing sizes would be appreciable to one of skill in the art.

In one embodiment, buckle mount 114 and strap mount 116 are attached to flattened end 104 by way of affixing screws. Other methods of attaching buckle mount and strap mount are possible. For example, in one embodiment, buckle mount and strap mount may be affixed to flattened end 104 by welding.

In one embodiment, a user will place a reciprocating massage device in massage gun cavity 120 and, using straps 118 and corresponding buckles 126, secure the reciprocating massage device to handle mechanism 100. Handle mechanism 100 is designed to be held by a user's hands in two positions, pivot grip 122 and distal grip 124. The reciprocating massage device is placed in massage gun cavity 120 in an orientation in which the reciprocating tip of the reciprocating massage device generally faces distal grip 124. In one embodiment, buckles 126 are commercially available snowboard ratchet buckles, such as model PRB-081S, manufactured by T.J. & Grace Industrial Corp. and straps are corresponding strap model LS-08, also manufactured by T.J. & Grace Industrial Corp. However, one of skill in the art may recognize that other fastening means may be used in order to securely fasten a reciprocating massage device in place while in operation. In particular, given the forces created by a conventional reciprocating massage device, buckles and straps are preferably constructed of sufficient quality to prevent a conventional reciprocating massage device from rotating or shifting once it is secured in place in massage gun cavity 120.

In one embodiment major curve 108 (also called a shoulder curve), located proximal to flattened end 104, is intended to provide space above a user's shoulder. Major curve 110 (also called a grip curve) is intended to assist in angling the device above the shoulder of a user who is using the reciprocating massage device. Major curve 112 (also called a handle curve) is intended to provide a handle to aid a user in providing a force perpendicular to the frontal plane of the user's body, however the handle need not be precisely perpendicular with the frontal plane of the user's body or with the axis of reciprocation of the reciprocating massage device. With a reciprocating massage device secured in massage gun cavity 120, when a user provides a force perpendicular to the frontal plane of the user's body, the user transfers a force using massage handle 100 that drives the reciprocating tip of the reciprocating massage device onto the back of the user's body.

In one embodiment distal end 106 comprises a rounded end cap made of a hard material such as a hard plastic. In this embodiment, distal end 106 may be additionally utilized by a user as a point massage device. In another embodiment, distal end 106 comprises a flat end made of a hard material such as a hard metal like aluminum or carbon steel.

Figure 1B:
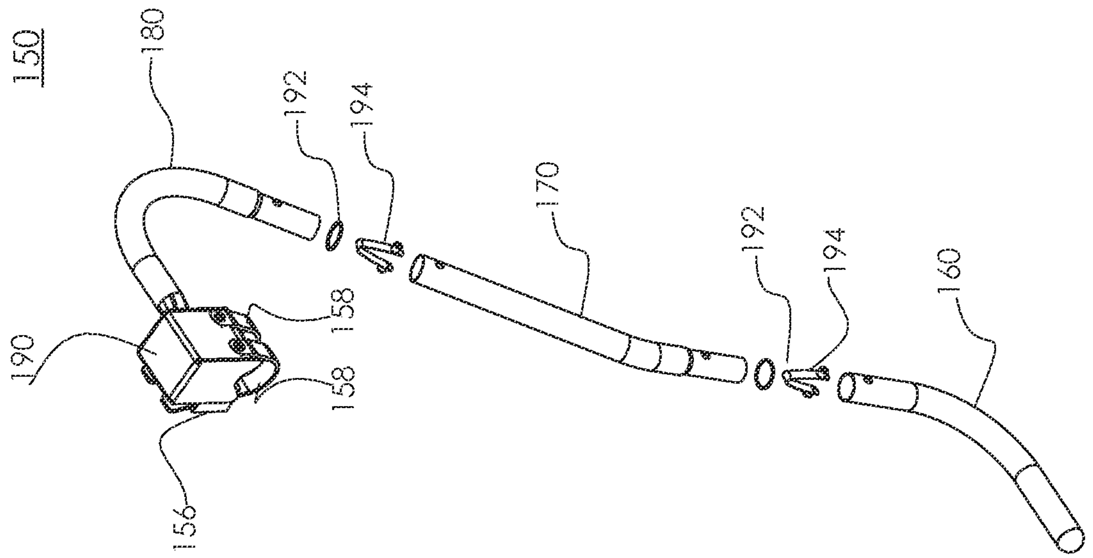
FIG. 1*b* shows various aspects of the extended handle mechanism in accordance with one embodiment.

FIG. 1*b* depicts another embodiment of the handle mechanism. As shown in FIG. 1*b*, handle mechanism 150 comprises multiple sections 160, 170, and 180 of metal tube (or other suitably rigid material). As depicted, grip section 170 has an end with a smaller diameter to be able to fit within handle section 160 (sometimes referred to distal section). Similarly, mounting section 180 has an end with a smaller diameter so that it may fit within grip section 170. As would be appreciated by one of skill in the art, other ways of configuring the telescoping nature of these sections are possible (e.g., providing narrower sections on each end of grip section 170, etc.). Handle section 160 is connected to grip section 170 using a spring button 194. O-ring 192 is placed between handle section 160 and grip section 170 to dampen vibration between sections. Similarly, grip section 170 is connected to mounting section 180 using a spring button 194 and O-ring 192. Through the use of separate sections, handle mechanism 150 may be dissembled and stored in a more convenient manner. Additionally, handle mechanism 150 may be equipped with back box 190 with flat surface 196 which attaches to the mounting end of mounting section 180. In one embodiment, back box 190 is secured using the same fasteners which are used to attach straps 158 and buckles 156. Back box 190 has a substantially flat surface 196 which is normal to the plane of actuation of an attached reciprocating massage device. In this configuration, a user may place the flat surface 196 of back box 190 against a wall or other surface to allow the user to easily engage the wall as an additional source of force for pressing an attached reciprocating massage device into the user's back.

Figure 2:
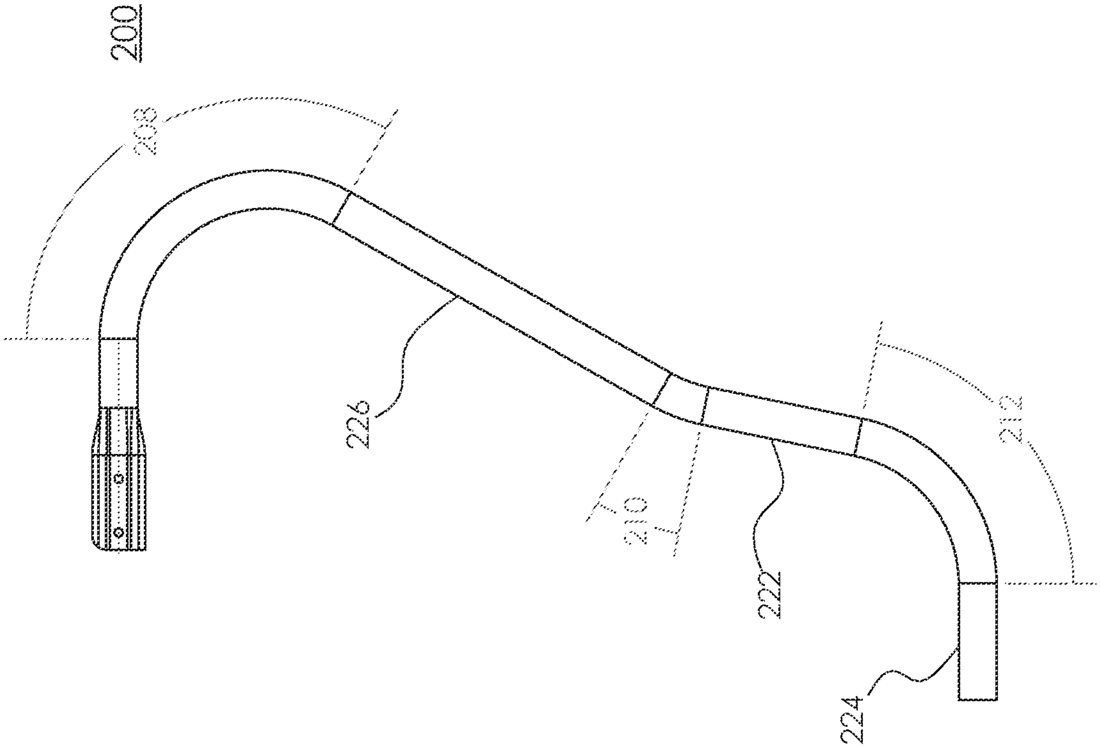
FIG. 2 shows various aspects of the extended handle mechanism in accordance with one embodiment.

FIG. 2 depicts certain aspects of one embodiment of the handle mechanism. As shown in FIG. 2, handle mechanism 200 is depicted as having three major curve angles, shoulder angle 208, grip angle 210, and handle angle 212. In one embodiment, shoulder angle 208 is approximately 119 degrees (i.e., the angle measure of the arc is approximately 119 degrees), grip angle 210 is approximately 18 degrees (i.e., the angle measure of the arc is approximately 18 degrees), and handle angle 212 is approximately 78 degrees (i.e. the angle measure of the arc is approximately 78 degrees). As will be appreciated by one of skill in the art, different curvature may be employed to ensure that handle mechanism 200 may comfortably fit around a user's body and enable a user to apply force to maneuver and direct a percussive massage device once it is attached. Generally, however, the sum of (shoulder angle) plus (handle angle) minus (grip angle) should approximate 180 degrees. However, in alternative embodiments not shown, the total sum of the curves could be between 150 and 210 degrees. As one of skill in the art would appreciate, handle angle should not exceed a curvature by which a user would not be able to apply force along the axis of reciprocation of an attached reciprocating massage device without losing the ability to maintain grip strength on distal grip 224. In another embodiment, rather than relying on three curves, the handle mechanism may comprise any number of curves or angles, provided that the distal end is located along the axis of reciprocation and distal grip 224 is located between 21 and 37 inches from the bottom of the angled channel which houses the handle of a reciprocating massage device.

In one embodiment, distal grip 224 (defined as the length of the segment between the end of handle mechanism 200 and the beginning of handle angle curve 212) is approximately 99 mm, pivot grip 222 (defined as the length of the segment between the ends of curves 212 and 210) is approximately 132 mm, and shoulder extension 226 (defined as the length of the segment between curves 210 and 208) is approximately 311 mm. However, one of skill in the art would recognize that different lengths may be desirable in order to provide accommodation for bodies of different sizes.

In one embodiment, lengths of distal grip, pivot grip, or shoulder extension may each (individually or in combination) be made adjustable through known means. For example, shoulder extension and pivot grip may comprise multiple telescoping members and a locking device such as a snap button or a set screw.

Figure 3:
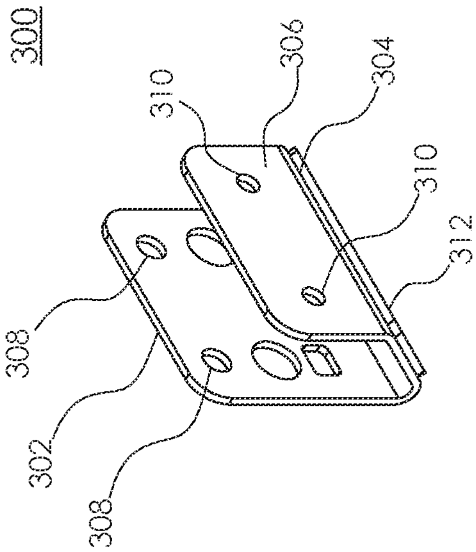
FIG. 3 shows various aspects of a buckle mount in accordance with one embodiment.

As shown in FIG. 3, buckle mount 300 comprises a piece of carbon steel, bent to create three faces, buckle face 302, massage gun face 304, and handle face 306. In one embodiment, buckle face 302 contains apertures 308 to receive rivet nuts to allow for a buckle to be affixed to buckle mount 300. As may be appreciated by one of skill in the art, other apertures may be included on buckle face 302 to ensure that the buckle is adequately secured to buckle face or to allow access to other portions of buckle mount for fastening to handle mechanism 100. In an alternative embodiment, buckle may be affixed to buckle mount through other means such as an adhesive, screw, welding, or other process. Further, as depicted, handle face 306 contains apertures 310 to be used in affixing buckle mount 300 to handle mechanism 100 at flattened end 104. Additionally, in one embodiment, adhesive pad 312 is affixed to massage gun face 304. Adhesive pad 312 is comprised of natural rubber to reduce vibrational effects of a reciprocating massage device but other materials may be used. While other non-slip pads may be used in place of rubber, because the clamping forces on the handle of the reciprocating massage device are high, natural rubber provides a soft surface to prevent damage to reciprocating massage device and aids in preventing the reciprocating massage device from rotating when secured by straps. In one embodiment, adhesive pad 312 is approximately 5 mm thick. As depicted, the plane of massage gun face 304 is oriented such that the plane of massage gun face 304 and the plane of buckle face 302 intersect at a 45-degree angle.

Figure 4:
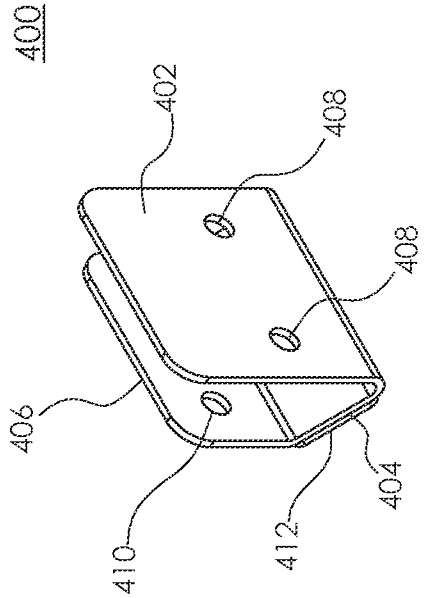
FIG. 4 shows various aspects of a strap mount in accordance with one embodiment.

As shown in FIG. 4, strap mount 400 comprises a piece of carbon steel, bent to create three faces, strap face 402, massage gun face 404, and handle face 406. In one embodiment, strap face 402 contains apertures 408 to receive rivet nuts to allow for straps to be affixed to strap mount 400. As may be appreciated by one of skill in the art, other apertures may be included on buckle face 402 to ensure that the straps are adequately secured to strap face or to allow access to other portions of strap mount for fastening to handle mechanism 100. In an alternative embodiment, straps may be affixed to strap mount through other means such as an adhesive, screws, welding, or other process. Further, as depicted, handle face 406 contains apertures 410 to be used in affixing strap mount 400 to handle mechanism 100 at flattened end 104. Additionally, in one embodiment, adhesive pad 412 is affixed to massage gun face 404. Adhesive pad 412 is comprised of natural rubber to reduce vibrational effects of a reciprocating massage device but other materials may be used. In one embodiment, adhesive pad 412 is approximately 5 mm thick. In one embodiment, the plane of massage gun face 404 is oriented such that the plane of massage gun face 404 and the plane of strap face 402 intersect at a 45-degree angle. When both buckle mount 300 and strap mount 400 are attached to flattened end 104, massage gun face 404 and massage gun face 304 together form massage gun cavity 120, which is an angled channel with an angle of approximately 90 degrees.

Figure 5:
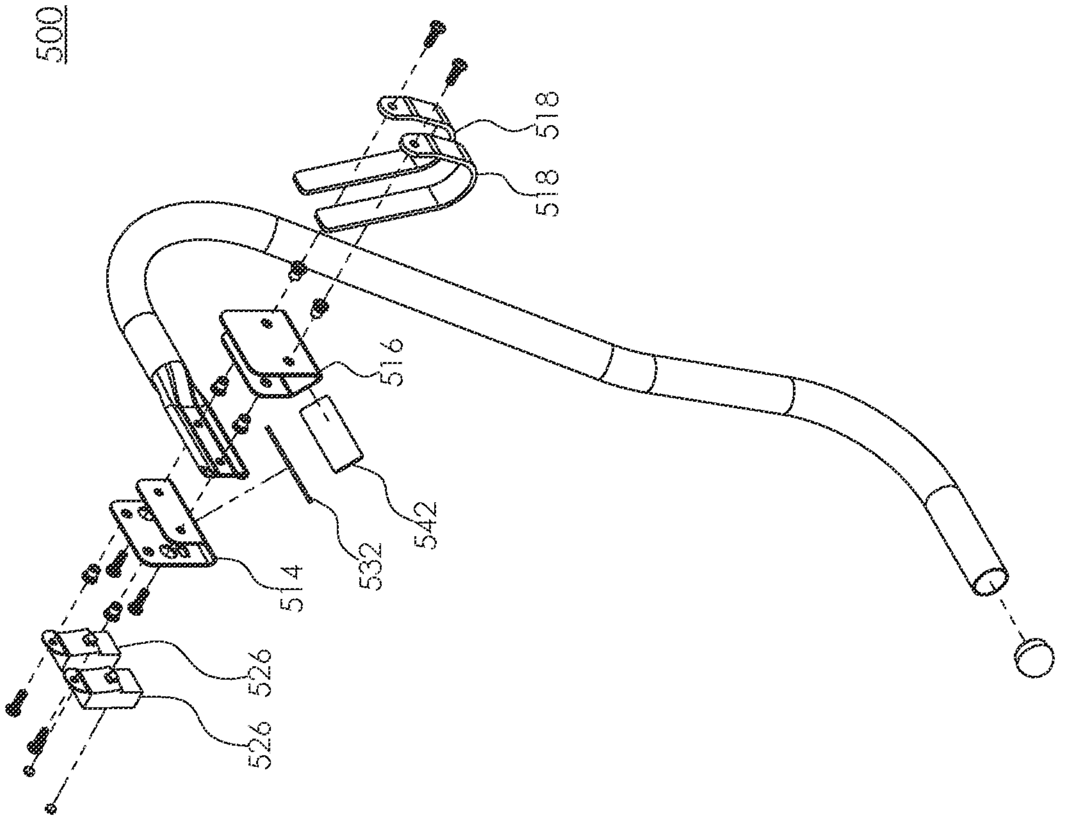
FIG. 5 shows various aspects of the extended handle mechanism in accordance with one embodiment.

As depicted in FIG. 5, handle mechanism 500 may be assembled so that two straps 518 correspond to two buckles 526. In the embodiment depicted in FIG. 5, two buckles and two straps are used to assist in preventing rotation of reciprocating massage device, however in alternative embodiments, additional or fewer buckles and straps may be employed. Additionally, as depicted in FIG. 5, adhesive pads 532 and 542 are attached to the corresponding massage gun face of buckle mount 514 and strap mount 516. In one embodiment, two buckles 526 are used in order to prevent rotation of an attached percussive massage device.

Figure 6:
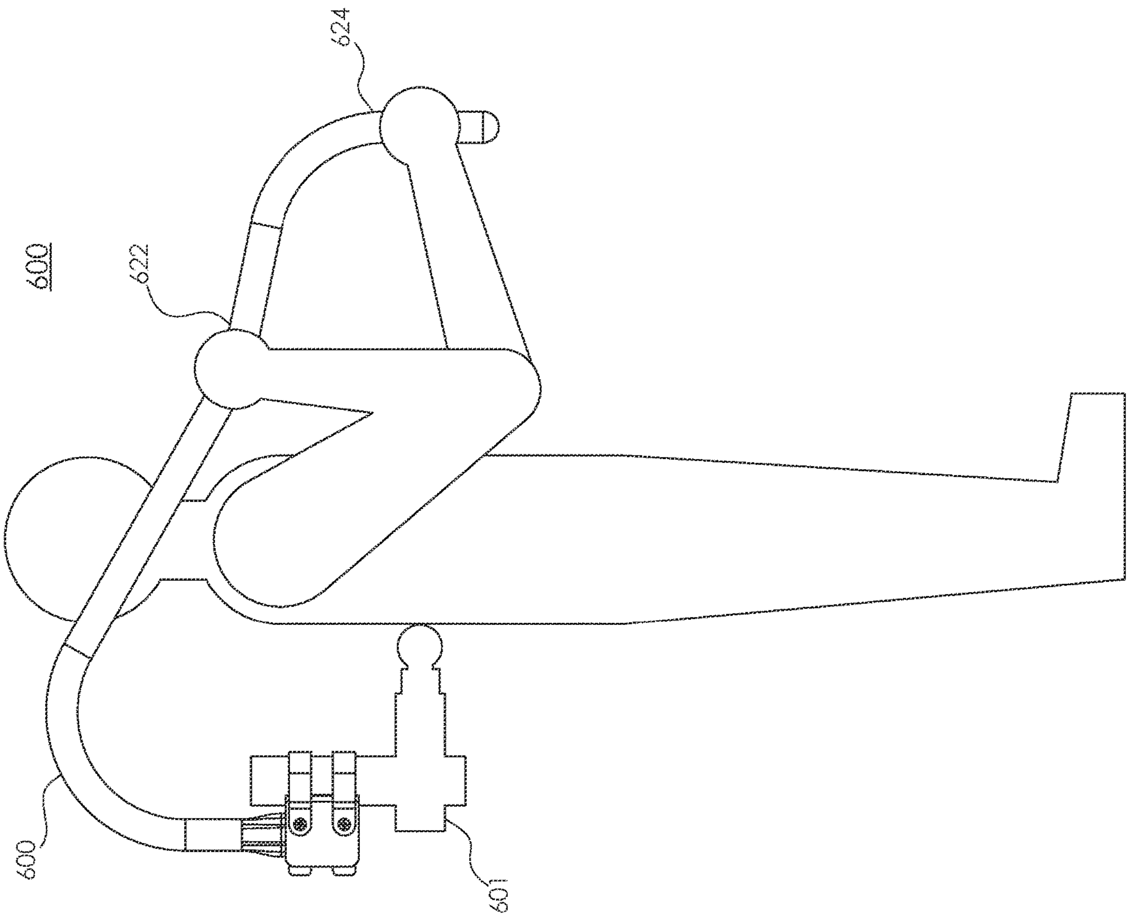
FIG. 6 shows various aspects of the extended handle mechanism while in use by a user.

As shown in FIG. 6 a user holding handle mechanism 600 with attached reciprocating massage device 601 may use handle mechanism 600 to direct reciprocating massage device 601 to desired areas of the user's body. By applying a force directed perpendicularly away from the frontal plane of the user's body through distal grip 624 and pivot grip 622, the reciprocating tip of reciprocating massage device 601 is pressed into the muscle tissue of the user. Additionally, by applying forces to pivot grip 624 in directions parallel to the user's frontal plane, the user is able to direct the location of the reciprocating tip of reciprocating massage device 601. Further, a user may direct the massage gun to different portions of the user's back by keeping the pivot hand substantially stationary and moving the user's distal hand. In this manner, the user bears the weight of the handle and massage gun on the user's locked pivot arm. As depicted, distal grip 624 is on the same axis as the reciprocating massage head, permitting the user to apply force to the massage gun without creating torque. In other embodiments, handle mechanism may take another shape, but pivot grip 622 is positioned in space relative to distal grip 624 so that a user may with one arm hold pivot grip 622 while the elbow is bent, and with the user's other arm, hold distal grip 624 with the elbow generally extended, thus encouraging a substantial portion of the weight of the device to be transferred to the user's body via the arm holding pivot grip 622.

Figure 7:
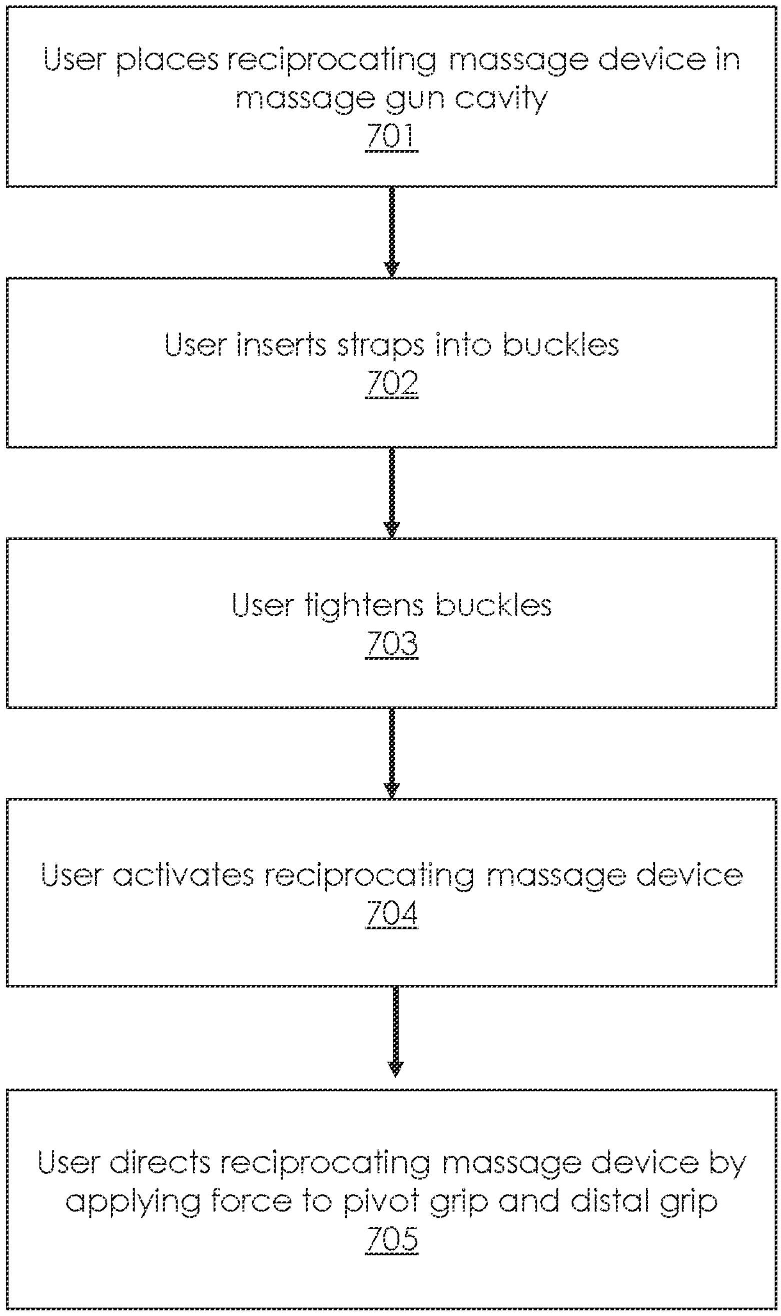
FIG. 7 is a flow chart diagram of a method for using the extended handle mechanism in accordance with one embodiment of the present invention.

FIG. 7 depicts a method of using a handle mechanism in accordance with one embodiment of the invention. In Step 701, a user places a reciprocating massage device in the massage gun cavity 120 with the reciprocating head of the reciprocating massage device facing toward distal grip 124. In Step 702, the user then secures the reciprocating massage device to the mounting portion of handle mechanism 100 by inserting straps 118 into buckles 126. In an alternative embodiment, a user may invert the order of steps 701 and 702, first inserting the straps 118 into buckles 126, creating a quasi-cylindrical cavity to insert the handle of reciprocating massage device into. In either scenario, in optional Step 703 user may further secure the reciprocating massage device into handle mechanism by tightening buckles 126 for example, by actuating a ratchet mechanism. In Step 704, user activates reciprocating massage device by pressing its power button or otherwise activating a switch. In Step 705, user lifts handle mechanism with reciprocating massage device now attached and directs the reciprocating massage device to the user's back by applying force to pivot grip 122 and distal grip 124. Particularly by applying force perpendicular to the user's frontal plane at distal grip 124, the user is able to press the massage device into the user's back without having to otherwise reach around the user's body.

Handle mechanism 100 effectively allows a direct pulling force on the reciprocating massage device while avoiding the obstacle that is the user's body. Additionally, the user may utilize the geometry of handle mechanism 100 to provide assistance in massaging other parts of the body. For example, rather than only have a single hand to hold a reciprocating massage device, a user may use the handle mechanism to distribute the weight of the reciprocating massage device while massaging the neck, glutes, quads, IT band, lower back, or other areas of the body.

In another embodiment, not depicted here, handle mechanism 100 may be equipped with electronic controls. Electronic controls may be placed at distal grip 124 or pivot grip 122 to aid a user in turning on or turning off the device while holding handle mechanism with both hands. In another embodiment, metal tube 102 may be bodily incorporated into a reciprocating massage device, such that buckles and straps may not be necessary. In another embodiment, handle mechanism 100 may be comprised of other materials, enabling additional geometric configurations. For example, handle mechanism 100 may be comprised of a single piece of molded plastic and may be a solid shape or hollow. Additionally, for example, handle mechanism 100 may be comprised of several pieces of molded or formed plastic parts that may be attached together. In another embodiment, massage gun 601 may be replaced by non-percussive static massage tips. In this embodiment, various tips with different contours may be used in order to provide varying contact points with the user's body. Each static massage tip may be designed to be mounted in the same position as a powered reciprocating massage device.

In another embodiment, at least one additional handle may be attached to handle mechanism 100. In this embodiment, the additional handle may be adjustable in position so that it may be moved along the length of handle mechanism 100 and may provide a grip for the user's hand that may be at a different angle and position than the metal tube. The at least one additional handle may be fixed in place through various means, e.g., a cam lever clamping mechanism.

The foregoing detailed description has been given for clearness of understanding only, and no unnecessary limitation should be understood therefrom. While the present invention has been described with reference to preferred embodiments and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention therefore shall be defined solely by the claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. An extended handle for a personal massage device, comprising:

an elongated rigid structure comprising:

a working end; and a handling end;

wherein said working end comprises a mount configured to secure a handle portion of a reciprocating massage gun;

wherein said mount comprises:

a first flange removably attached to a flattened portion of said working end and a second flange removably attached to said flattened portion of said working end, wherein said first flange and said second flange are arranged to form an angular channel with a channel surface facing said handling end.

2. The extended handle of claim 1, wherein said mount further comprises:

a padding material affixed to said channel surface; and a clamp attached to an exterior surface of said angular channel.

3. The extended handle of claim 2, wherein said clamp comprises:

a buckle affixed to said exterior surface; and a strap affixed to said exterior surface;

wherein said buckle is configured to engage said strap to secure an object placed in said angular channel.

4. The extended handle of claim 3, wherein said object placed in said angular channel is said handle portion of said reciprocating massage gun, wherein said reciprocating massage gun further comprises an axis of reciprocation, and said handling end is positioned a distance of between 21 and 37 inches from a narrow end of said angular channel, said distance measured along said axis of reciprocation of said reciprocating massage gun.

5. The extended handle of claim 3, wherein said elongated rigid structure further comprises a first curved portion, a second curved portion; and a third curved portion.

6. The extended handle of claim 5, wherein said first curved portion is located proximal to said working end and has an arc angle of approximately 119 degrees; said third curved portion is located proximal to said handling end and has an arc angle of approximately 78 degrees; and said second curved portion is located between said first curved portion and said third curved portion and has an arc angle of −18 degrees.

7. The extended handle of claim 5, wherein the sum of the arc angles of the first, second, and third curved portions is approximately 180 degrees.

8. The extended handle of claim 7, wherein said elongated rigid structure comprises three telescoping sections.

9. The extended handle of claim 1, wherein said handling end comprises a distal grip which is angled such that said distal grip is oriented perpendicularly with respect to an axis of reciprocation of said reciprocating massage gun.

10. An extended handle for a personal massage device, comprising:

an elongated rigid structure comprising:

a working end; and a handling end;

wherein said working end comprises:

a flattened portion of said elongated rigid structure comprising a first flat side and a second flat side; and a mount configured to secure a handle portion of a handheld massage device, wherein said mount comprises a first flange and a second flange, wherein said first flange removably attached to said first flat side and said second flange removably attached to said second flat side, wherein said first flange and said second flange are arranged to create an angular channel.

11. The extended handle of claim 10, wherein said mount further comprises:

a buckle and a strap;

wherein said first flange comprises a first angled face, a buckle face, and a first tube mating face;

wherein said first angled face is adjacent to said buckle face and said first tube mating face, said first angled face is disposed at a 135 degree angle to said first tube mating face, and said first angled face is further disposed at a 45 degree angle to said buckle face;

wherein said first tube mating face is attached to said first flat side of said flattened portion of said elongated rigid structure;

wherein said buckle is attached to said buckle face;

said second flange comprises a second angled face, a strap face, and a second tube mating face;

wherein said second angled face is adjacent to said strap face and said second tube mating face, said second angled face is disposed at a 135 degree angle to said second tube mating face, and said second angled face is further disposed at a 45 degree angle to said strap face;

wherein said second tube mating face is attached to said second flat side of said flattened portion of said elongated rigid structure; and wherein said strap is attached to said strap face.

12. The extended handle of claim 10, wherein said elongated rigid structure further comprises a first curved portion, a second curved portion; and a third curved portion.

13. The extended handle of claim 12, wherein said first curved portion is located proximal to said working end, said third curved portion is located proximal to said handling end, and said second curved portion is located between said first curved portion and said third curved portion, and wherein the sum of the arc angles of said first, second, and third curved portions is approximately 180 degrees.

14. The extended handle of claim 13, wherein said first curved portion has an arc angle of approximately 119 degrees; said third curved portion has an arc angle of approximately 78 degrees; and said second curved portion has an arc angle of approximately −18 degrees.

15. The extended handle of claim 14, wherein said elongated rigid structure comprises three telescoping sections.

16. The extended handle of claim 15 wherein each of said telescoping sections are secured to one another utilizing a spring button.

17. The extended handle of claim 16, further comprising a first O-ring and second O-ring, wherein said first O-ring is positioned between said first curved portion and said second curved portion, and wherein said second O-ring is positioned between said second curved portion and said third curved portion.

18. A method for utilizing an extended handle mechanism for a reciprocating massage device, the method comprising:

placing said reciprocating massage device in an angular channel of said extended handle mechanism, said extended handle mechanism comprising a working end, a handling end, and multiple curved portions, wherein said angular channel is disposed at said working end of said extended handle mechanism and said angular channel comprised of a first flange and second flange removably attached to a flattened portion of said working end and arranged to create said angular channel, wherein said working end further comprises a fastener, and wherein the sum of the arc angles of said multiple curved portions is approximately 180 degrees, securing said reciprocating massage device to said extended handle mechanism using said fastener;

activating said reciprocating massage device;

holding said reciprocating massage device with at least one hand at said handling end;

positioning said reciprocating massage device at a desired position on a user's body by applying force to said extended handle mechanism; and applying force to said handling end to engage said reciprocating massage device with said user's body at said desired position.

* * * * *